US006757281B1

(12) United States Patent
Irish

(10) Patent No.: US 6,757,281 B1
(45) Date of Patent: Jun. 29, 2004

(54) ROUTE SERVER

(75) Inventor: Wesley R. Irish, Redwood City, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/465,018

(22) Filed: Dec. 16, 1999

(51) Int. Cl.[7] .............................................. H04L 12/28
(52) U.S. Cl. ..................... 370/389; 370/395.4; 370/401; 370/465
(58) Field of Search ................................ 370/389, 390, 370/392, 395.1, 395.5, 395.51, 395.52, 395.53, 395.54, 401, 465, 466; 709/225, 238, 242

(56) References Cited

U.S. PATENT DOCUMENTS

| 5,600,644 A | * | 2/1997 | Chang et al. ............... 370/404 |
| 5,751,971 A | * | 5/1998 | Dobbins et al. ............ 709/238 |
| 5,920,699 A | * | 7/1999 | Bare .......................... 709/225 |
| 6,130,892 A | * | 10/2000 | Short et al. ................. 370/401 |
| 6,157,644 A | * | 12/2000 | Bernstein et al. ........... 370/392 |
| 6,172,981 B1 | * | 1/2001 | Cox et al. ................... 370/401 |

OTHER PUBLICATIONS

Alexander, MPOA Basics, pp. 1–26, Oct. 7, 1997.*
Rayan, MPOA Multiple Protocol over ATM, pp. 1–17, 1997.*
Douglas E. Comer, "Principles, Protocols, and Architecture," Internetworking With TCP/IP, vol. I, Second Edition, 1991.
J.S. Quarterman, "RFC 1027—Using ARP to Implement Transparent Subnet Gateways" Request for Comments, 'Online!, pps. 1–7, Oct. 1987.
A Tanenbaum, "Computer Networks Third Edition", Prentice Hall, pps. 420–423, 1996.
J. Postel, "RFC 925—Multi–Lan Address Resolution" Request for Comments, 'Online!, pps. 1–15, Oct. 1984.

* cited by examiner

Primary Examiner—Frank Duong
(74) Attorney, Agent, or Firm—Finnegan, Henderson, Farabow, Garrett & Dunner, L.L.P.

(57) ABSTRACT

Method and apparatus for exchanging packets between networks using switches and without using routers for routing the packets to the destination. The method includes assembling a logically addressed packet for transmission on a network. Furthermore, the method includes determining whether an address map of a host assembling the logically addressed packet includes a physical address of a destination. Moreover, the method includes encapsulating the logically addressed packet in the physical address of the destination to form an encapsulated logically addressed packet, when the physical address of the destination for the logically addressed packet is included in the address map of the host. Further, the method includes assessing whether the physical address of the destination indicates that the destination is part of the same network as the host, when the address map of the host does not include the physical address of the destination. In addition, the method includes broadcasting an address request for the physical address of the destination, when the address map of the host does not include the physical address of the destination; and receiving a response to the broadcasted address request, wherein the response provides the physical address of the destination, and wherein said receiving step is performed when the address map of the host assembling the logically addressed packet does not include the physical address of the destination.

45 Claims, 2 Drawing Sheets

ROUTE SERVER

BACKGROUND OF THE INVENTION

I. Field of Invention

The present invention relates generally to computer networking. More particularly, the present invention relates to a method and apparatus for exchanging packets between networks using switches and without using a router for routing.

II. Description of the Related Art

Modern computer networks including the Internet commonly layer protocols using protocol layering models such as the open systems interconnect (OSI) seven layer networking model and the transport control protocol (TCP)/internet protocol (IP) Internet layering model. These models promote distributed computing and facilitate network-to-network connectivity. Further, these models facilitate the exchange of packets or datagrams between hosts, or clients, on disparate networks.

The exchange of IP packets between hosts on networks such as the Internet are well documented in, for example, "Internetworking with TCP/IP, Volume I, Principles, Protocols, and Architectures," Douglas E., Comer, 1991, which is incorporated herein by reference. When a host attached to a network prepares to send an IP packet to its intended destination, the host may perform a route determination process and an address resolution process to decide where the IP packet is to be sent. Further, the route determination process and the address resolution process are logical decisions, whereby the IP packet is either switched to its intended destination ("layer 2 switching") or forwarded to a device such as a gateway or router (collectively referred to herein below as a "router") for IP based routing ("routing") through the network (e.g., the Internet) serving the intended destination.

Layer 2 switching refers to switching based on a layer 2 address. Examples of layer 2 addresses include an Ethernet address or a media-access control (MAC) address. The layer 2 address permits an Ethernet frame (or packet) to be switched to the correct destination on a physical network such as an Ethernet. For example, to switch an IP packet that is encapsulated within an Ethernet frame, an Ethernet network may use a layer 2 device (e.g., a switch) to switch the Ethernet frame to the intended destination based on the MAC-address of the destination.

Since layer 2 switching typically only concerns itself with MAC-layer addresses (e.g., a 48-bit physical address), the layer 2 device (also referred to herein as a "switch" and a "layer 2 switch") that performs the layer 2 switching usually maintains an address table to track the MAC-addresses associated which each port on the layer 2 device. For example, when a packet comes in one port, the switch determines whether the address table includes the MAC-address of the destination and uses the MAC-address for switching the packet to the appropriate output port on the switch. Since the switch only concerns itself with MAC-layer address of the destination, the switch does not read the IP address of incoming packets while switching the incoming packet to its intended destination.

Layer 3 refers to the IP and IP packet format. A layer 3 network comprises a network that utilizes IP packets, routes packets from a source network to its destination network based on the IP address included within the IP packet (i.e., an IP address), and relies on a device such as a gateway or router (also referred to herein as a "layer 3 device") to read the IP address within the IP packet and to forward the IP packet to the destination network based on the IP address.

Routers evaluate the IP address associated with an IP packet. Routers typically use an address mask (also referred to as "sub-net mask") to determine the network (or sub-network) identifier of the destination. The router utilizes the address mask to filter the IP address of the IP packet, which reveals the network identifier associated with the IP packet. After determining the network identifier for the destination, the router refers to a routing table that includes information for forwarding the IP packet to the destination based on the network identifier. The router then modifies the packet or datagram and forwards the packet or datagram towards its destination.

Devices that provide layer 2 switching are usually faster when compared to devices that route. However, a layer 2 device (e.g., a switch, a switching hub, or an ATM switch) is usually configured so that client devices (e.g., hosts) attached to the ports of the layer 2 device are logically affiliated with each other in a virtual LAN (VLAN) or sub-network to the exclusion of other client devices on other ports that are affiliated with a different VLAN or sub-network. This affiliation into VLANs permits broadcast traffic to be exchanged between the logically affiliated client devices of a VLAN to the exclusion of the other client devices affiliated with the other VLAN. The layer 2 device may utilize multiple VLANs within the same device by logically partitioning the switch into two or more networks and/or sub-networks. Since multiple VLANs (i.e., multiple networks and/or sub-networks) may be associated with a single layer 2 device or an interconnected set of switches, the use of a router is required to permit transferring IP packets across the logical boundaries of the VLANs, even when the packet source and packet destination reside on different ports of the same layer 2 device (e.g., a switch).

With a network using the IP protocol, when an IP client wants to send packets to another device that is on the same local IP sub-network, the IP client (e.g., a host) must map the destination IP address to the appropriate destination MAC-address. This is typically done using an address resolution protocol (ARP) and a local cache that contains a table translating the IP address to a MAC-address on the local VLAN or network. This IP address to MAC-address information is then cached or stored in the original client for use with subsequent packets to the same destination IP address. When an IP client wants to send packets to another device on another IP sub-network that is not local to the IP client, the IP client would encapsulate the packet and forward the encapsulated packet to an appropriate router for delivery to the destination.

Alternatively, an IP client may rely on Proxy ARP to exchange packets with another device on another IP sub-network. Proxy ARP is an address resolution protocol in which a router answers an ARP request with its own physical address. By pretending to be the destination host, the router accepts responsibility (i.e., proxies) for routing the IP packet to the destination host. With a network using Proxy ARP, all IP packets destined for the destination host use the router to forward the IP packets to the destination host, which provides an increased processing burden on the router and increases delay. The use of ARP and Proxy ARP are well documented in, for example, "Internetworking with TCP/IP, Volume I, Principles, Protocols, and Architectures," Douglas E., Comer, 1991, which is incorporated herein by reference.

SUMMARY OF THE INVENTION

Accordingly, the present invention is directed to a method and apparatus for exchanging packets with switches. In particular, the present invention is directed to a method and apparatus for exchanging packets without using routers for routing the packets to the destination, which substantially obviates one or more of the problems due to limitations and disadvantages of the related art.

Additional features and advantages of the invention will be set forth in part in the description which follows, and in part will be obvious from the description, or may be learned by practice of the invention. The objectives and advantages of the invention may be realized and attained by means of the instrumentalities and combinations particularly pointed out in the appended claims.

To achieve these and other advantages and in accordance with the purpose of the invention, as embodied and broadly described herein, there is provided a method for exchanging packets comprising the steps of assembling a logically addressed packet for transmission on a network; determining whether an address map of a host assembling the logically addressed packet includes a physical address of a destination; encapsulating the logically addressed packet in the physical address of the destination to form an encapsulated logically addressed packet, when the physical address of the destination for the logically addressed packet is included in the address map of the host; assessing whether the physical address of the destination indicates that the destination is part of the same network as the host, when the address map of the host does not include the physical address of the destination; broadcasting an address request for the physical address of the destination, when the address map of the host does not include the physical address of the destination; and receiving a response to the broadcasting of an address request, wherein the response provides the physical address of the destination, wherein the receiving step is performed when the address map of the host assembling the logically addressed packet does not include the physical address of the destination.

In another embodiment of the present invention, there is provided an apparatus for exchanging packets, comprising means for assembling a logically addressed packet for transmission on a network; means for determining whether an address map of a host assembling the logically addressed packet includes a physical address of a destination; means for encapsulating the logically addressed packet in the physical address of the destination to form an encapsulated logically addressed packet, when the physical address of the destination for the logically addressed packet is included in the address map of the host; means for assessing whether the physical address of the destination indicates that the destination is part of the same network as the host, when the address map of the host does not include the physical address of the destination; means for broadcasting of an address request for the physical address of the destination, when the address map of the host does not include the physical address of the destination; and means for receiving a response to the broadcasting an address request, wherein the response provides the physical address of the destination, wherein the means for receiving receives when the address map of the host assembling the logically addressed packet does not include the physical address of the destination.

In yet another embodiment of the present invention, there is provided a computer program product comprising computer-readable media having computer-readable code which, when run on a computer, causes the computer to exchange packets, comprising the following computer-readable program code for effecting actions in the computer: program code for assembling a logically addressed packet for transmission on a network; program code for determining whether an address map of a host assembling the logically addressed packet includes a physical address of a destination; program code for encapsulating the logically addressed packet in the physical address of the destination to form an encapsulated logically addressed packet, when the physical address of the destination for the logically addressed packet is included in the address map of the host; program code for assessing whether the physical address of the destination indicates that the destination is part of the same network as the host, when the address map of the host does not include the physical address of the destination; program code for broadcasting an address request for the physical address of the destination, when the address map of the host does not include the physical address of the destination; and program code for receiving a response to the broadcasting an address request, wherein the response provides the physical address of the destination, wherein the program code for receiving step receives when the address map of the host assembling the logically addressed packet does not include the physical address of the destination.

In still another embodiment of the present invention, there is provided a route server for providing physical address information during an exchange of packets between at least two hosts on networks comprising means for assessing whether the physical address of the destination indicates that the destination is part of the same network as the host, when the address map of the host does not include the physical address of the destination; means for recognizing whether the physical address of the destination is recognized and supported, when the physical address of the destination corresponds to a second sub-network, and when the address map does not include the physical address of the destination; and means for returning the physical address of a first device, when the physical address is not recognized, is not supported, and is not part of the same sub-network, and when the address map of the host does not include the physical address of the destination.

In yet another embodiment of the present invention, there is provided a computer program product comprising computer-readable media having computer-readable code which, when run on a computer, causes the computer to provide physical address information during an exchange of packets between at least two hosts on networks, comprising the following computer-readable program code for effecting actions in the computer: program code for assessing whether the physical address of the destination indicates that the destination is part of the same network as the host, when the address map of the host does not include the physical address of the destination; program code for recognizing whether the physical address of the destination is recognized arid supported, when the physical address of the destination corresponds to a second sub-network, and when the address map does not include the physical address of the destination; and program code for returning the physical address of a first device, when the physical address is not recognized, is not supported, and is not part of the same sub-network, and when the address map of the host does not include the physical address of the destination.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Generally, the present invention is directed to a method and apparatus for exchanging packets. In particular, the present invention is directed to a method and apparatus for exchanging packets on a network using at least one switch and without using a router for routing.

Figure 1:
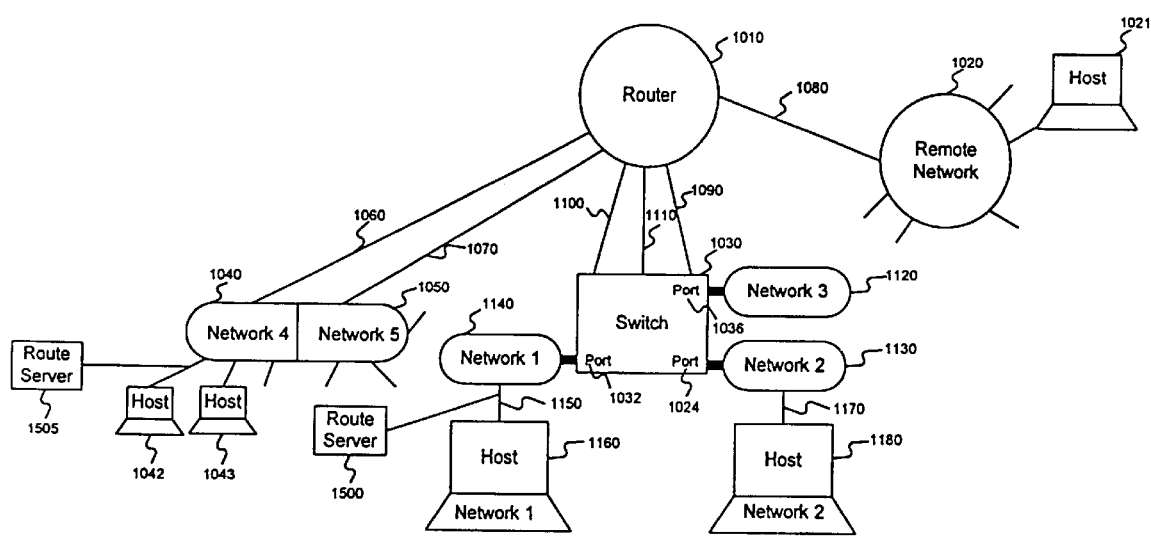
FIG. 1 illustrates, in general block diagram form an exemplary network, constructed in accordance with the present invention.

FIG. 1 illustrates, in general block diagram form, an exemplary network designed in accordance with the present invention. As shown in FIG. 1, the network 1000 includes a router 1010, a plurality of route servers 1500, 1505, a plurality of network interconnections 1060, 1070, 1080, 1090, 1100, 1110, 1150, 1170, a first sub-network 1140, a second sub-network 1130, a third sub-network 1120, a fourth sub-network 1040, a fifth sub-network 1050, a remote sub-network 1020, a switch 1030, and a plurality of port connections 1036, 1024, 1032 and a plurality of hosts 1021, 1042, 1043, 1160, 1180. The exemplary network 1000 embodied in FIG. 1 may include additional devices (e.g., hubs, servers, firewalls, etc.) and alternate configurations without departing from the spirit of the present invention.

The router 1010 may be implemented with a variety of devices that permit routing using the IP address of the destination. The routing function may be performed by other physical devices including, for example, a stand-alone router, a host, or any other communication device capable of performing the function of routing based on the IP address of the packet or datagram. Furthermore, the router 1010 provides routing between different sub-networks and/or virtual local area networks (VLANs).

Each of the route servers 1500, 1505 of the present invention may be implemented with a data processor (not shown) or a set of data processors, or within a variety of devices including, for example, the host 1160, 1180, the switch 1030, or any other network device on the network 1000 that is capable of performing the functions of the route server, as described herein. Although FIG. 1 shows a plurality of stand-alone route servers 1500, 1505, the functions of the route server 1500 may be implemented within one or more of the physical devices on the network 1000 (e.g., within the host 1160, and/or within the switch 1030). By way of non-limiting example, each of the route servers 1500, 1505 may be incorporated into the host 1160 and/or switch 1030 without departing from the spirit of the present invention.

The network interconnections 1060, 1070, 1080, 1090, 1100, 1110, 1150, 1170 provide connections between devices on the network. The network interconnections provide a physical and logical pathway for the transport of data between the sub-networks (e.g., the first sub-network 1140 and the second sub-network 1130). The network interconnections may be implemented with a variety of physical and logical means including, for example, fiber optic, twisted pair, 10BaseT, Ethernet, and/or any other means capable of transporting data across the network 1000.

The first sub-network 1140, the second sub-network 1130, the third sub-network 1120, the fourth sub-network 1040, the fifth sub-network 1050, and the remote sub-network 1020 comprise separate sub-networks or virtual local area networks (VLANs). The first sub-network 1140, the second sub-network 1130, and the third sub-network 1120 share the same switch 1030, even though each of these sub-networks uses a different port 1024, 1032, 1036 on the switch 1030. For routing purposes, the second sub-network 1130 and the remote sub-network 1020 are logically (i.e., from an IP address perspective) part of the same sub-network. The remote sub-network 1020 provides network access to at least one of the hosts (e.g., host 1021). In the embodiment illustrated in FIG. 1, the fourth sub-network 1040 and the fifth sub-network 1050 share a layer 2 device (not shown) such as an ATM switch, a Gigabit Ethernet switch, and/or any other device capable of providing switching based on a media-access layer address. However, the fourth sub-network 1040 and the fifth sub-network 1050 maintain separate and discrete IP networks. Consequently, if the host 1042 on the fourth sub-network 1040 broadcasts IP packets to other members of the fourth sub-network, the layer 2 device (not shown) would not transmit these IP packets to the fifth sub-network 1050, even though the sub-networks share a common layer 2 device.

The switch 1030 may be implemented with a variety of devices that provide switching based on a physical address (also referred to herein as a "layer 2 physical address", or a "media-access layer address") including, for example, an ATM switch, a Gigabit Ethernet switch, and/ or any other communication device capable of switching based on a physical address. By way of non-limiting example, switch 1030 receives packets and switches the received packet to an appropriate port 1024, 1032, 1036 based upon the physical address or a media-access layer (MAC-layer) address encapsulating the packet. The physical address encapsulating the packet serves to address the packet to the destination (e.g., a destination host, a destination client, and/or a destination server) or to a network device (e.g., a router, and/or a switch) that is along the general path towards the destination.

Each of the hosts 1021, 1042, 1043, 1160, 1180 of FIG. 1 may be implemented with a data processor (not shown) or a set of data processors to perform the functions of assembling packets for an exchange between networks such as between networks. Each of the hosts 1021, 1042, 1043, 1160, 1180 may also include, for example, one or more of the following additional components: one or more central processing units, a co-processor, memory, storage, registers, an input device, an output device, and/or other data processing devices and systems as appropriate. Further, each of the hosts 1021, 1042, 1043, 1160, 1180 and/or any of the above modules, devices, components, or functions of the invention may be embodied in any suitable combination of hardware, software, or firmware and may be embodied as a separate system or incorporated into another device.

Figure 2:
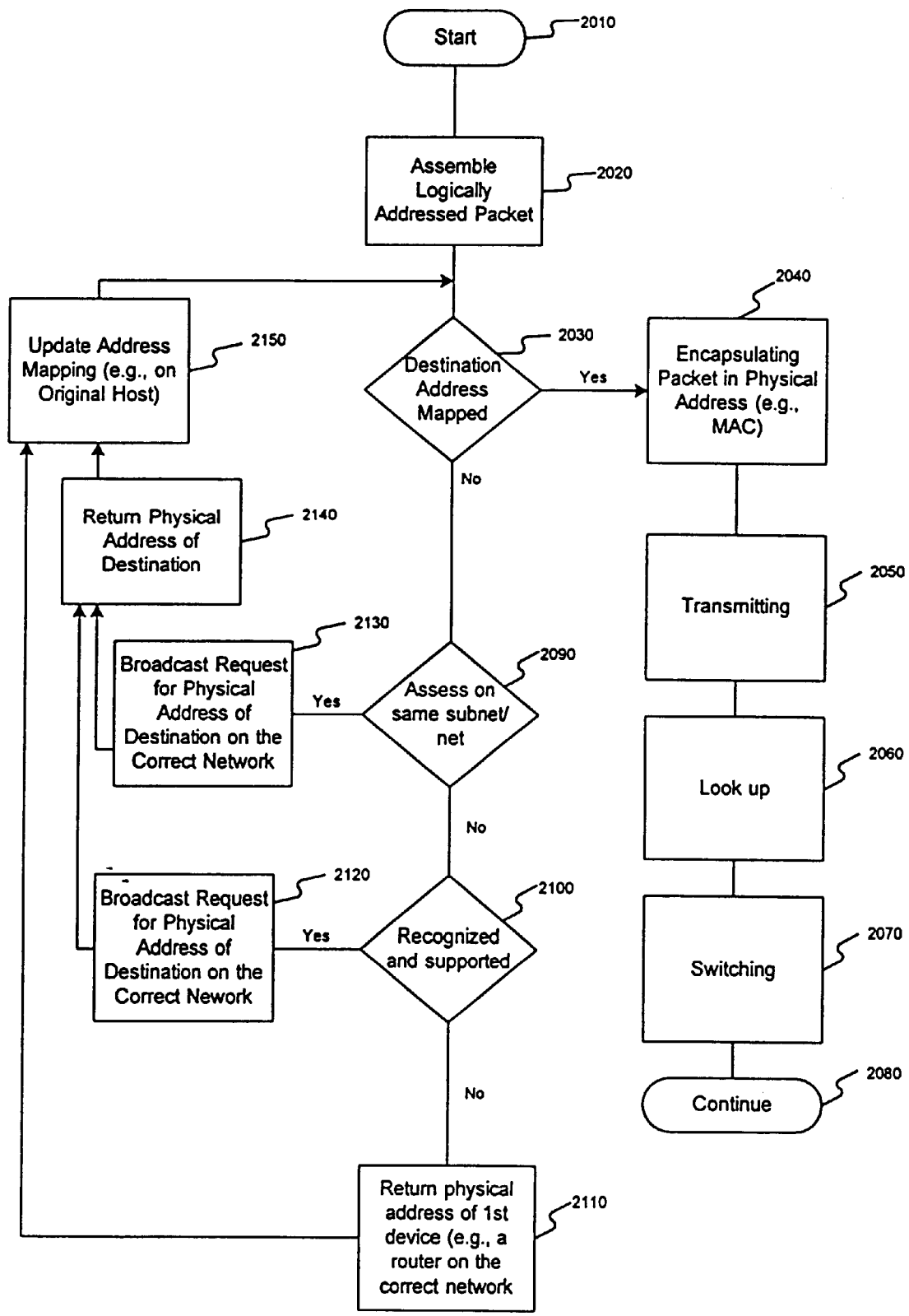
FIG. 2 is an exemplary flowchart depicting steps associated with exchanging packets between different networks, in accordance with the present invention.

FIG. 2 illustrates an exemplary flow chart depicting steps associated with exchanging packets between different networks (e.g.,.;different layer 3 networks), in accordance with the present invention.

Referring to FIG. 2, by way of non-limiting example, in an embodiment of the present invention, the process 2000 starts (step 2010) when a host (e.g., host 1160) assembles a logically addressed packet or datagram (e.g., an IP packet) for transmission to a destination through the network 1000 (step 2020). The host determines whether an address map for translating the IP address of the destination to the MAC-layer address of the destination includes a MAC-layer address for the logically addressed packet (step 2030). If the address map includes the MAC-layer address of the destination (yes at step 2030), the host encapsulates the logically address packet within the MAC-layer address of the destination (step 2040); transmits the encapsulated logically address packet to a network device such as the switch 1030 (step 2050). The switch 1030 receives the encapsulated logically addressed packet on one of its ports; determines the appropriate output port based on a switching table (step 2060); and switches the packet to the output port indicated by the switching table (step 2070). For a plurality of packets from the host to the destination, the switch continues (step 2080) to provide switching for packets to the output port corresponding to the MAC-layer address indicated by the switching table. Furthermore, the switch 1030 continues switching (step 2080) without requiring the use of a layer 3 device such as an IP router because the incoming packets include the appropriate MAC-layer address for the destination.

If the address map does not include a translation from the IP address of the destination to the MAC-layer address of the destination (no at step 2030), the host provides the route server with the logically addressed packet. The route server assesses whether the MAC-layer address of the destination is part of the same sub-network and/or VLAN (step 2090) as the host.

If route server assesses that the MAC-layer address of the destination is part of the same sub-network and/or VLAN (yes at step 2090) as the host, the route server broadcasts an address request for the MAC-layer address of the destination (step 2130) on the same sub-network or VLAN. When the route server receives a response to the broadcast that includes the MAC-layer address (step 2140) for the destination, the route server updates (step 2150) the address map associated with the host by modifying the MAC-layer address corresponding to the IP address of the destination.

In an alternate implementation of the present embodiment, if the route server assesses that the MAC-layer address of the destination is part of the same sub-network and/or VLAN (yes at step 2090) as the host, the route server selects the MAC-layer address from a table and updates (step 2150) the address map associated with the host by modifying the MAC-layer address corresponding to the IP address of the destination.

In yet another alternate implementation, if route server assesses that the MAC-layer address of the destination is part of the same sub-network and/or VLAN (yes at step 2090) as the host, the route server may permit the host to resolve the MAC-layer address of the destination (step 2130) without any intervention on the part of the route server.

Once the address map is updated, the route server executes step 2030. Since the MAC-layer address of the destination is listed (step 2030) within the address map, the route server performs steps 2040–2070, which enables the IP packet to be exchanged with the destination without the use of a layer 3 device such as an IP router. Since the host's address map includes the MAC-address corresponding to the IP address of the destination, the host may continue (step 2080) exchange a plurality of packets by performing steps 2020–2080 without the use of a layer 3 device for routing.

If the route server assesses that the MAC-layer address of the destination is not part of the same sub-network or VLAN (no at step 2090) as the host, the route server evaluates the logically addressed packet (e.g., an IP packet) and determines whether the MAC-layer address of the destination for the logically addressed packet is recognized and supported (step 2100). By way of non-limiting example, the route server may recognize that the MAC-layer address for the destination is supported by the switch, even if the destination is on a different sub-network than the host (e.g., when the destination and the host are on the same switch and different sub-networks).

If the MAC-layer address of the destination is recognized and supported (yes at step 2100), the route server broadcasts an address request for the MAC-layer address of the destination (step 2120) on the correct sub-network or VLAN which the route server recognizes and supports. When the route server receives a response to the broadcast that includes the MAC-layer address (step 2140), the route server proceeds to update (step 2150) the address map by modifying the MAC-layer address corresponding to the IP address of the destination.

In an alternate implementation of the present embodiment, if the MAC-layer address of the destination is recognized and supported (yes at step 2100), the route server selects the MAC-layer address from a table and updates (step 2150) the address map associated with the host by modifying the MAC-layer address corresponding to the IP address of the destination.

In yet another alternate implementation of the present embodiment, when the route server broadcasts an address request for the MAC-layer address of the destination (step 2120) on the correct sub-network or VLAN which the route server recognizes and supports, the response to the broadcast that includes the MAC-layer address (step 2140) is received by the host, with the route server remaining idle. The host then proceeds to update (step 2150) the address map by modifying the MAC-layer address corresponding to the IP address of the destination.

Once the address map is updated (step 2150), the route server proceeds to execute step 2030. Since the MAC-layer address of the destination is listed in the address map (step 2030), steps 2040–2080 are performed. Furthermore, since the address map includes the MAC-address of the destination, the host may continue (step 2080) to exchange a plurality of IP packets with the destination by performing steps 2020–2080 and without using a layer 3 device for routing.

If the MAC-layer address of the destination for the logically addressed packet is not recognized and not supported (no at step 2100), the route server returns the MAC-layer address of an appropriate device that is either on the same sub-network or VLAN with the destination or that is along the path towards the destination (step 2110). The appropriate device may be a network device, a switch, an IP router, or any other device capable of forwarding the packet or datagram to its destination. Moreover, the route server may select the appropriate device from a list of candidate. Furthermore, the appropriate device may actually consist of a set of appropriate devices. With the MAC-layer address of the appropriate device, the route server then proceeds to update (step 2150) the address map of the host by associating the IP address of the destination with the MAC-layer address.

The route server executes step 2030. Since the destination address is mapped (step 2030), the route server performs steps 2040–2070, which enables the packet to be exchanged. Since the address map includes a MAC-address for the destination, the host may continue (step 2080) to perform a exchange with a plurality of packets by performing steps 2020–2080.

In the present invention, once the address map is updated with the MAC-layer address of the destination (step 2150), the route server executes step 2030. Alternatively, once the address map is updated with the MAC-layer address of the destination (step 2150), the route server may notify and, thus, permit the host to begin performing steps 2030–2080.

In yet another alternative implementation of the route server, the route server may encapsulate the IP packet of the destination host with a special instruction for the switch. The switch then proceeds to interpret, execute, and/or forward the instruction contained within the IP packet.

The switch 1030 determines the appropriate output port 1024, 1032, 1036 using a switching table (step 2060). A switching table may take the following form:

| Switching Table | | |
| --- | --- | --- |
| Host Device (Name) | Hardware Address | Port |
| A | 0090 2019BCFD | 42 |
| K | 0402 8E 463597 | 3 |

The switch 1030 uses the MAC-layer address from the switching table to switch the received packet to the appropriate output port (step 2070).

By way of non-limiting example, the present invention will now be illustrated by way of exemplary packet exchanges between hosts. Referring again to FIG. 1, the first example illustrates the present invention in an exchange of packets between two hosts on the same sub-network or VLAN such as an exchange between two host on the fourth sub-network 1040 (e.g., host 1042 and host 1043). The second example illustrates the present invention in an exchange of packets between two hosts on different sub-networks when the destination address is recognized and supported such as an exchange between the host 1160 and the destination host 1180. The third example illustrates the present invention in an exchange of packets or datagrams between two hosts on the different sub-networks when the address of the destination is not recognized and is not supported such as an exchange between host 1160 and host 1021.

EXAMPLE 1

Referring to FIG. 1, by way of non-limiting example, the present invention provides a method and apparatus for exchanging packets between two hosts on the same sub-network or VLAN such as an exchange between the host 1042 and the destination host 1043 on the fourth sub-network 1040. Referring again to FIG. 2, the process 2000 starts (step 2010) when the host 1042 assembles a logically addressed packet (e.g., an IP packet) for transmission to the destination host 1043 (step 2020). The IP packet assembled by the host 1042 may include data from a higher layer application (e.g., e-mail, word processing, TCP, FTP, etc.) on the host 1042.

The host 1042 evaluates the IP address on the IP packet and determines whether the address map associated with the host 1042 includes a translation from the IP address of the destination host 1043 to the MAC-layer address of the destination host 1043 (step 2030). The address map associated with host 1042 may be resident within the host 1042, route server 1500, or any other device capable of storing and providing the address map. The address map associated with host 1042 may take the following form:

| ADDRESS MAP (Host 1043) | |
| --- | --- |
| IP Address (32 Bit) | MAC-Layer Address (48 bit) |
| 28.238.42.1 (i.e., Host 1043) | 0:0:c:1:a2:e (i.e., Host 1043) |

Although the host 1042 of the present example maintains its own address map, the address map associated with the host 1042 may be consolidated with the address maps of multiple hosts within a sub-network or network.

Since the address map includes the MAC-layer address of the destination host 1043 (yes at step 2030), the host 1042 encapsulates the IP packet within the MAC-layer address (e.g., 0:0:c:1:a2:e) of the destination host 1043 (step 2040). The host 1042 proceeds to transmit the encapsulated IP packet to a network device such as a switch (not shown) (step 2050).

The switch (not shown) receives the encapsulated IP packet on one of its ports and determines the appropriate output port by reading the MAC-layer address (e.g., 0:0:c:1:a2:e) and by looking up the MAC-layer address (e.g., 0:0:c:1:a2:e) in the switching table (step 2060). Referring again to FIG. 2, the switch switches the IP packet to the output port indicated by the switching table (step 2070), which places the IP packet on the same port with the destination host 1043. For a plurality of packets from the host 1042 to the destination host 1043, the switch continues (step 2080) to provide switching for packets to the output port based on the MAC-layer address included in the switching table. Furthermore, the switch continues switching (step 2080) without requiring the use of a layer 3 device for routing because the incoming packets include the appropriate MAC-layer address for the destination host 1043.

If the address map associated with the host 1042 does not include a translation from the IP address of the destination host 1043 to the MAC-layer address of the destination host 1043 (no at step 2030), host 1042 provides the route server 1505 with the IP packet. The route server 1505 reads the IP address contained within the IP packet and assesses whether the MAC-layer address of the destination host 1043 is part of the same sub-network and/or VLAN (step 2090) as the host 1042. For example, the route server 1505 may evaluate the IP address with an address mask and determine that the host 1042 and the destination host 1043 are on the same sub-network (i.e., the fourth sub-network 1040).

If route server 1505 assesses that the MAC-layer address of the destination host 1043 corresponds to the same sub-network and/or VLAN as the host 1042 (yes at step 2090), the route server 1505 broadcasts an address request for the physical address of the destination host 1043 (step 2130) on the correct network (i.e., the fourth sub-network 1040). When the destination host 1043 receives the broadcast requesting its MAC-layer address, the destination host 1043 responds with its MAC-layer address.

When the route server 1505 receives the response from the destination host 1043 that includes the MAC-layer address (step 2140) of the destination host 1043, the route server 1505 updates (step 2150) the address map associated with the host 1042 by adding the MAC-layer address (e.g., 0:0:c:1:a2:e) of the destination host 1043. The route server 1505 executes step 2030. Since the MAC-layer address for the destination host 1043 is included in the address map (step 2030) of the host 1042, the route server 1505 performs steps 2040–2070, which enables the IP packets to be exchanged between the host 1042 and the destination host 1043 without the use of a layer 3 device for routing. Moreover, since the address map associated with the host 1042 includes the MAC-address of the destination host 1043, the host 1042 may continue (step 2080) exchanging a plurality of packets with the destination host 1043 without using a router.

EXAMPLE 2

Referring again to FIG. 1, by way of non-limiting example, the present invention provides a method and apparatus for exchanging packets between two hosts on different sub-networks when the destination address is recognized and supported such as an exchange between the host 1160 and the destination host 1180.

Referring again to FIG. 2, the process 2000 starts (step 2010) when the host 1160 assembles an IP packet for transmission to a destination (e.g., host 1180) (step 2020). The IP packet assembled by the, host 1160 may include data from a higher layer application (e.g., e-mail, word processing, TCP, FTP, etc.).

Since the host 1160 and the destination host 1180 are on different sub-networks, the address map associated with the host 1160 may not include a translation from the IP address to the MAC-layer address of the destination host 1180 (no at step 2030). Consistent with the present invention, the host 1160 then forwards the IP packet to the route server 1500 for ultimate delivery to the destination host 1180.

Since the host 1160 and the destination host 1180 are on different sub-networks, the route server 1500 assesses whether the MAC-layer address of the destination host 1180 is part of another sub-network by reading the IP address on the IP packet. By way of non-limiting example, the route server 1500 may utilize an address mask to determine whether the host 1160 and the destination host 1180 are on different sub-networks.

If the route server 1500 assesses that the destination host 1180 is not part of the same sub-network or VLAN (no at step 2090) as the host 1160, the route server 1500 determines whether destination host 1180 for the logically addressed packet is recognized and supported (step 2100). By way of non-limiting example, the route server 1500 may recognize that the MAC-layer address for the destination is supported by the switch 1030, even if the destination is on a different sub-network than the host 1160 (e.g., when the host and the destination host are on the same switch 1030 and different sub-networks). Furthermore, the route server 1500 may include historical information or shared information (e.g., from other route servers) that indicates the destination host 1180 is recognized and supported.

If the address is recognized and supported (yes at step 2100), the route server 1500 broadcasts an address request for the MAC-layer address of the destination host (step 2120) through the switch 1030 and onto the correct sub-network (i.e., the second sub-network 1130) that is recognized and supported. When the destination host 1180 receives the broadcast requesting its MAC-layer address, the destination host 1180 responds with its IP address and MAC-layer address.

When the route server 1500 receives the response to the broadcast that includes the MAC-address of the destination host 1180 (step 2140), the route server 1500 proceeds to update (step 2150) the address map associated with the host 1160 by adding and or modifying the MAC-layer address associated with the destination host 1180.

Once the address map is updated (step 2150), the route server 1500 proceeds to execute step 2030. Since the destination address is mapped (step 2030), steps 2040–2080 may be performed as described above. Furthermore, since the address map associated with the host 1160 includes the MAC-address corresponding to the destination host 1180, the host 1160 may continue (step 2080) to forward IP packets to the destination host 1180 without using a router for routing, which reduces the overall cost of the network 1000 by reducing and/or eliminating the need for routers.

EXAMPLE 3

Referring to FIG. 1, by Way of non-limiting example, the present invention provides a method and apparatus for exchanging packets between two hosts on different sub-networks when the destination address is not recognized and is not supported such as an exchange between the host 1160 and the destination host 1021.

Referring again to FIG. 2, the process 2000 starts (step 2010) when the host 1160 assembles an IP packet for transmission to the destination host 1021 (step 2020). The IP packet assembled by the host 1160 may include data from a higher layer application (e.g., e-mail, word processing, TCP, FTP, etc.).

Since the host 1160 and the destination host 1021 are on different sub-networks, the address map associated with the host 1160 may not include the MAC-layer address of the destination host 1021 (no at step 2030). In accordance with the present invention, the host 1160 forwards the IP packet to the route server 1500 for ultimate delivery to the destination host 1021.

Since the host 1160 and the destination host 1021 are on different sub-networks, the route server 1500 assesses whether the destination host 1021 is part of another sub-network by reading the IP address on the IP packet. By way of non-limiting example, the route server 1500 may use an address mask to determine whether the host 1160 and the destination host 1021 are on different sub-networks. Furthermore, since the host 1160 and the destination host 1021 are on different sub-networks, the MAC-layer address of the destination host 1021 may not be recognized and may not be supported (no at step 2100) by the route server 1500 or the local switch 1030. In accordance with the present invention, the route server 1500 returns the MAC-layer address of an appropriate device (e.g., a network device, the router 1010) that is capable of forwarding the packet or datagram to the destination host 1021.

The route server 1500 proceeds to update (step 2150) the address map of the host 1160 by associating the IP address of the destination host 1021 with the MAC-layer address of the appropriate device (e.g., the router 1010). The route server 1500 then executes step 2030.

Once the address map is updated (step 2150), the route server 1500 performs steps 2040–2070, which enables the IP packet to be exchanged with the destination host 1021 by forwarding the IP packet to-the MAC-address of the appropriate device.

Since the address map includes a MAC-layer address for the appropriate device, the host 1160 may continue (step 2080) to forward IP packets to the destination host 1021 without using a router for routing.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. In particular, although the above teachings refer to the use of IP packets, the present invention may utilize other networking protocols without departing from the spirit of the invention. The scope of the invention is defined by the claims and their equivalents. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for exchanging packets comprising the steps of:

assembling, at a host, a logically addressed packet for transmission on a network;

determining, at the host, whether an address map of the host assembling the logically addressed packet includes a physical address of a destination;

encapsulating, at the host, the logically addressed packet in the physical address of the destination to form an encapsulated logically addressed packet, when the physical address of the destination for the logically addressed packet is included in the address map of the host;

assessing, at a route server, whether the physical address of the destination indicates that the destination is part of the same network as the host, when the address map of the host does not include the physical address of the destination;

recognizing, at the route server, whether the physical address of the destination is recognized and supported by a switch, when the physical address of the destination corresponds to another sub-network coupled to the switch, and when the address map does not include the physical address of the destination;

broadcasting, at the route server, an address request for the physical address of the destination, when the address map of the host does not include the physical address of the destination; and receiving, at the route server, a response to said broadcasting of an address request, wherein the response provides the physical address of the destination, wherein said receiving step is performed when the address map of the host assembling the logically addressed packet does not include the physical address of the destination.

2. The method of claim 1, wherein said broadcasting is on the same network as the destination.

3. The method of claim 1, further comprising updating the address map of the host by adding the physical address of the destination.

4. The method of claim 1, further comprising returning the physical address of a first device, when the physical address is not recognized, is not supported, and is not part of the same sub-network, and when the address map of the host does not include the physical address of the destination.

5. The method of claim 4, further comprising transmitting the encapsulated logically addressed packet to the switch connected to the host.

6. The method of claim 5, further comprising switching the encapsulated logically addressed packet to a port corresponding to the physical address of the destination.

7. The method of claim 6, wherein switching further comprises evaluating a switching table to determine the appropriate port corresponding to the physical address of the destination.

8. The method of claim 6, further comprising continuing to switch a plurality of encapsulated logically addressed packets to the destination based on the physical address of the destination.

9. The method of claim 6, further comprising continuing to switch a plurality of encapsulated logically addressed packets to the destination based on the physical address of the destination without referring to the logical address of said plurality of encapsulated logically addressed packets.

10. The method of claim 9, further comprising defining the physical address as a media-access layer address.

11. The method of claim 9, further comprising exchanging packets between two virtual local area networks representing the host and the destination, respectively, without requiring the use of a device for routing.

12. The method of claim 11, further comprising defining said device as a router.

13. The method of claim 11, wherein exchanging further comprises defining exchanging to comprise an exchange between a plurality of layer 3 networks.

14. A system for exchanging packets, the system including a host and a route server, the system further comprising:

means for assembling, at the host, a logically addressed packet for transmission on a network;

means for determining, at the host, whether an address map of the host assembling the logically addressed packet includes a physical address of a destination;

means for encapsulating, at the host, the logically addressed packet in the physical address of the destination to form an encapsulated logically addressed packet, when the physical address of the destination for the logically addressed packet is included in the address map of the host;

means for assessing, at the host, whether the physical address of the destination indicates that the destination is part of the same network as the host, when the address map of the host does not include the physical address of the destination;

means for recognizing, at the route server, whether the physical address of the destination is recognized and supported by a switch, when the physical address of the destination corresponds to another sub-network coupled to the switch, and when the address mar does not include the physical address of the destination;

means for broadcasting, at the route server, an address request for the physical address of the destination, when the address map of the host does not include the physical address of the destination; and means for receiving, at the route server, a response to said broadcasting of an address request, wherein the response provides the physical address of the destination, wherein said means for receiving receives when the address map of the host assembling the logically addressed packet does not include the physical address of the destination.

15. The system of claim 14, further comprising means for updating the address map of the host by adding the destination.

16. The system of claim 14, wherein said means for broadcasting broadcasts the address request on the same network as the destination.

17. The system of claim 14, further comprising means for returning the physical address of a first device, when the physical address is not recognized, is not supported, and is not part of the same sub-network, and when the address map of the host does not include the physical address of the destination.

18. The system of claim 17, further comprising means for transmitting the encapsulated logically addressed packet to a switch connected to the host.

19. The system of claim 18, wherein the switch switches the encapsulated logically addressed packet to a port corresponding to the physical address of the destination.

20. The system of claim 19, wherein said switch further comprises means for evaluating a switching table to determine the appropriate port corresponding to the physical address of the destination.

21. The system of claim 19, further comprising means for continuing to switch a plurality of encapsulated logically addressed packets to the destination based on the physical address of the destination.

22. The system of claim 19, further comprising means for continuing to switch a plurality of encapsulated logically addressed packets to the destination based on the physical address of the destination without referring to the logical address of said plurality of encapsulated logically addressed packets.

23. The system of claim 22, further comprising means for defining the physical address as a media-access layer address.

24. The system of claim 22, further comprising means for exchanging packets between two virtual local area networks representing the host and the destination, respectively, without requiring the use of a device for routing.

25. The system of claim 24, wherein means for exchanging further comprises means for defining said means for exchanging to comprise an exchange between a plurality of layer 3 networks.

26. The system of claim 24, further comprising means for defining said device as a router.

27. A computer program product comprising computer-readable media having computer-readable code which, when run on a computer, causes the computer to exchange packets, comprising the following computer-readable program code for effecting actions in the computer:

program code for assembling, at a host, a logically addressed packet for transmission on a network;

program code for determining, at the host, whether an address map of the host assembling the logically addressed packet includes a physical address of a destination;

program code for encapsulating, at the host, the logically addressed packet in the physical address of the destination to form an encapsulated logically addressed packet, when the physical address of the destination for the logically addressed packet is included in the address map of the host;

program code for assessing, at a route server, whether the physical address of the destination indicates that the destination is part of the same network as the host, when the address map of the host does not include the physical address of the destination;

program code for recognizing, at the route server, whether the physical address of the destination is recognized and supported by a switch, when the physical address of the destination corresponds to another sub-network coupled to the switch, and when the address map does not include the physical address of the destination;

program code for broadcasting, at the route server, an address request for the physical address of the destination, when the address map of the host does not include the physical address of the destination; and program code for receiving at the route server, a response to said broadcasting of an address request, wherein the response provides the physical address of the destination, wherein said program code for receiving receives when the address map of the host assembling the logically addressed packet does not include the physical address of the destination.

28. The computer program product according to claim 27, wherein said program code for broadcasting broadcasts the address request on the same network as the destination.

29. The computer program product according to claim 27, further comprising program code for updating the address map of the host by adding the destination.

30. The computer program product according to claim 27, further comprising program code for returning the physical address of a first device, when the physical address is not recognized, is not supported, and is not part of the same sub-network, and when the address map of the host does not include the physical address of the destination.

31. The computer program product according to claim 30, further comprising program code for transmitting the encapsulated logically addressed packet to the switch connected to the host.

32. The computer program product according to claim 31, further comprising a switch for switching the encapsulated logically addressed packet to a port corresponding to the physical address of the destination.

33. The computer program product according to claim 32, wherein said switch further comprises program code for evaluating a switching table to determine the appropriate port corresponding to the physical address of the destination.

34. The computer program product according to claim 32, further comprising continuing to switch a plurality of encapsulated logically addressed packets to the destination based on the physical address of the destination.

35. The computer program, product according to claim 32, further comprising program code for continuing to switch a plurality of encapsulated logically addressed packets to the destination based on the physical address of the destination without referring to the logical address of said plurality of encapsulated logically addressed packets.

36. The computer program product according to claim 35, further comprising program code for defining the physical address as a media-access layer address.

37. The computer program product according to claim 35, further comprising program code for exchanging packets between two virtual local area networks representing the host and the destination, respectively, without requiring the use of a device for routing.

38. The computer program product according to claim 37, wherein program code for exchanging further comprises defining said program code for exchanging to comprise a program code for exchanging between a plurality of layer 3 networks.

39. The computer program product according to claim 37, further comprising program code for defining said device as a router.

40. A computer program product comprising computer-readable media having computer-readable code which, when run on a computer, causes the computer to provide physical address information during an exchange of packets between at least two hosts, comprising the following computer-readable program code for effecting actions in the computer:

program code for assessing, at the route server, whether the physical address of the destination indicates that the destination is part of the same network as the host, when the address map of the host does not include the physical address of the destination;

program code for recognizing, at the route server, whether the physical address of the destination is recognized and supported by a switch, when the physical address of the destination corresponds to a second network coupled to the switch, and when the address map does not include the physical address of the destination; and program code for returning, at the route server, the physical address of a first device, when the physical address is not recognized, is not supported, and is not part of the same sub-network, and when the address map of the host does not include the physical address of the destination.

41. The computer program product according to claim 40, further comprising program code for updating the address map of the host by adding the destination.

42. The computer program product according to claim 41, further comprising program code for encapsulating the logically addressed packet in an instruction for a switch, wherein said switch executes the instruction when it receives the instruction.

43. A route server for providing physical address information during an exchange of packets between at least two hosts on layer 3 networks comprising:

means for assessing, at the route server, whether the physical address of the destination indicates that the destination is part of the same network as the host, when the address map of the host does not include the physical address of the destination;

means for recognizing, at the route server, whether the physical address of the destination is recognized and supported by a switch, when the physical address of the destination corresponds to a second network coupled to the switch, and when the address map does not include the physical address of the destination; and means for returning, at the route server, the physical address of a first device, when the physical address is not recognized, is not supported, and is not part of the same network, and when the address map of the host does not include the physical address of the destination.

44. The route server of claim 43, further comprising means for updating the address map of the host by adding the destination.

45. The route server of claim 43, further comprising means for encapsulating the logically addressed packet in an instruction for a switch, wherein said switch executes the instruction when it receives the instruction.

* * * * *

UNITED STATES PATENT AND TRADEMARK OFFICE
CERTIFICATE OF CORRECTION

PATENT NO.   : 6,757,281 B1                                         Page 1 of 1
DATED        : June 29, 2004
INVENTOR(S)  : Wesley R. Irish It is certified that error appears in the above-identified patent and that said Letters Patent is hereby corrected as shown below:

Column 14,
Line 47, "mar" should be -- map --.

Column 16,
Line 38, "program, product" should be -- program product --.

Column 17,
Line 19, "claim 41" should be -- claim 40 --.

Signed and Sealed this

Seventeenth Day of August, 2004

JON W. DUDAS
*Acting Director of the United States Patent and Trademark Office*